United States Patent [19]

Bailey et al.

[11] Patent Number: 4,993,544
[45] Date of Patent: * Feb. 19, 1991

[54] PLASTIC MODULAR CONVEYOR BELTS AND MODULES THEREFOR

[75] Inventors: Peter K. Bailey, Easton; Michael L. Spangler, Cambridge, both of Md.

[73] Assignee: Cambridge Wire Cloth Company, Cambridge, Md.

[*] Notice: The portion of the term of this patent subsequent to Jan. 16, 2007 has been disclaimed.

[21] Appl. No.: 412,451

[22] Filed: Sep. 26, 1989

Related U.S. Application Data

[63] Continuation of Ser. No. 296,792, Jan. 13, 1989, Pat. No. 4,893,710.

[51] Int. Cl.$^5$ ............................................. B65G 23/06
[52] U.S. Cl. ..................................... 198/834; 198/853
[58] Field of Search ............... 198/851, 852, 853, 831, 198/834; 474/206, 212, 213, 219; 403/154, 155

[56] References Cited

U.S. PATENT DOCUMENTS

| | | | |
|---|---|---|---|
| 4,556,142 | 12/1985 | Lapeyre | 198/853 X |
| 4,742,907 | 5/1988 | Palmaer | 198/852 X |
| 4,754,872 | 7/1988 | Damkjaer | 198/852 |
| 4,765,454 | 8/1988 | Hodlewsky et al. | 198/853 X |
| 4,821,872 | 4/1989 | Lapeyre | 198/853 |
| 4,865,183 | 9/1989 | Hodlewsky et al. | 198/853 X |
| 4,886,158 | 12/1989 | Lapeyre | 198/853 |
| 4,901,844 | 2/1990 | Palmaer et al. | 198/852 X |

FOREIGN PATENT DOCUMENTS

| | | | |
|---|---|---|---|
| 1201407 | 3/1984 | Canada | 198/851 |
| 175483 | 3/1986 | European Pat. Off. | 198/853 |

OTHER PUBLICATIONS

Wiremation Industries Information (12 pages).

Primary Examiner—Robert P. Olszewski
Assistant Examiner—Cheryl L. Gastineau
Attorney, Agent, or Firm—Rothwell, Figg, Ernst & Kurz

[57] ABSTRACT

A plastic conveyor belt is formed of a plurality of non-reversible modules having inter-fitting link ends connected together and hinged by pivot rods having a rod capturing arrangement at each end of the outermost link ends of end module assemblies which is a blocking member insertable into a slot in the widest and outermost link end with the flat surface of the blocking member facing the rod and a projection for cooperating with the rod hole for holding the blocking member in place but allowing it to be removed. The belt also has internal modules in addition to end modules and all modules are constructed such that the narrowest link ends of unequal width link ends are adjacent sprocket cavities but are offset in a direction of another link end to provide additional strength and rigidity.

1 Claim, 3 Drawing Sheets

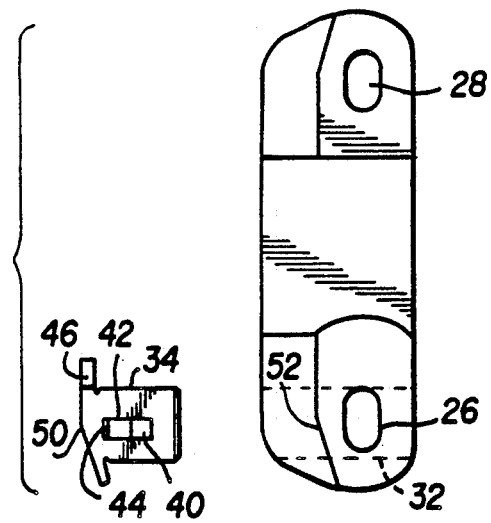
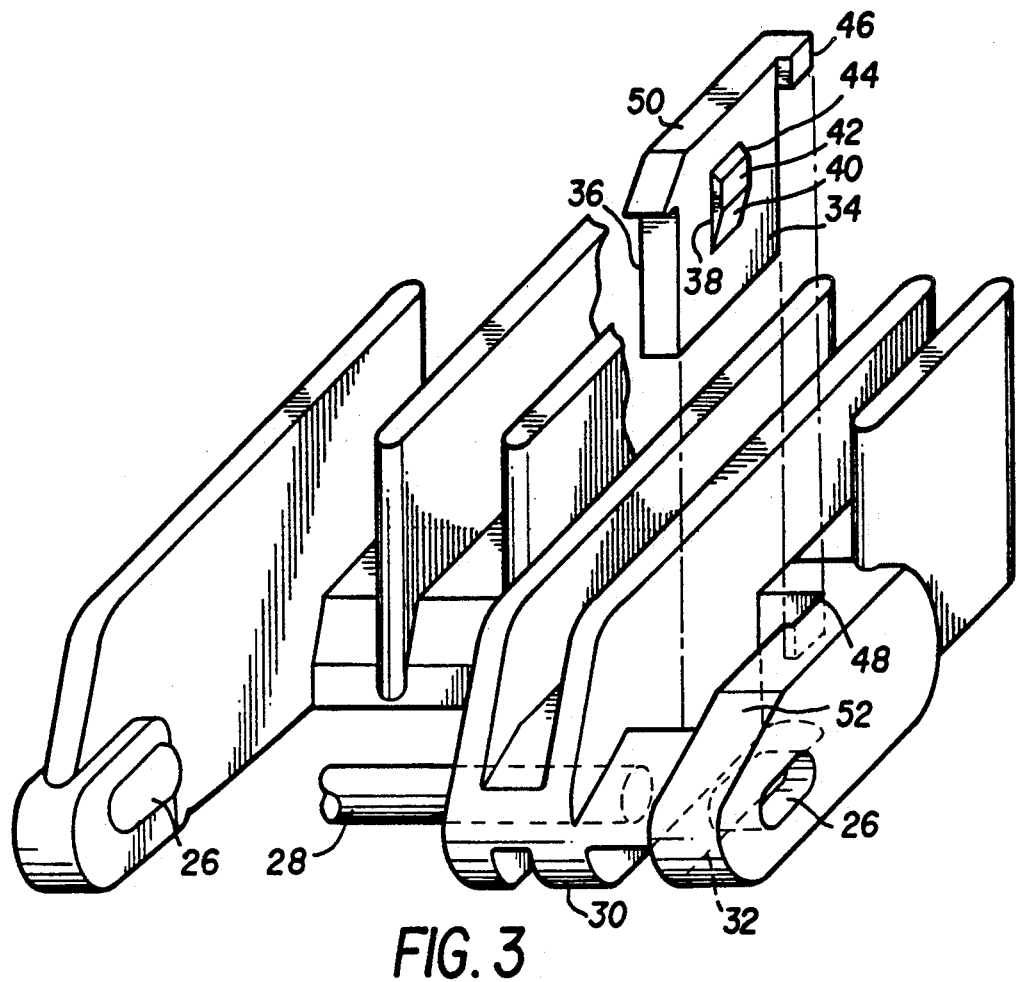

PLASTIC MODULAR CONVEYOR BELTS AND MODULES THEREFOR

This is a continuation of application Ser. No. 07/296,792, filed Jan. 13, 1989 now U.S. Pat. No. 4,893,710.

BACKGROUND OF THE INVENTION

1. Field Of The Invention

This invention relates to improvements in plastic conveyor belts of the type having a plurality of links or modules connected together to form a continuous belt with connecting rods or pins, and in particular to a unique improvement for capturing the connecting rods and an innovative construction of different modules which are assembled to make the conveyor.

2. Background And Prior Art

The art on plastic conveyor belts utilizing modules with inter-fitting link ends is well known and well worked. In such belts a pivot rod connects the interfitting link ends so that the modules can be assembled with the rods to form a continuous belt. The rods permit angular rotation between adjacent modules as required when the belt goes around sprockets or rolls on the conveyors while at the same time the rods connect and transmit the forces between the adjacent modules. In practice these connecting rods are subject to large forces. Due to the broad range of application in which plastic conveyors are commonly used, the forces and the reaction of the rods to these forces is many times unpredictable. It is of utmost importance that the rods that connect the modules be positively captured within the conveyor belt assembly. Failure to accomplish such results in numerous problems, not the least of which is the belt actually falling apart in use. Other problems include interference between partially exposed rods and the surrounding conveyor structure. Additionally, as a practical matter the rods must be easily insertable and removable from the belt, as such is normally required during belt assembly, belt installation or belt repair. Furthermore, it is desirable to accomplish this without the use of any special equipment or tool. Such is particularly important when considering field installation and repair since special tools represent both added costs and inconvenience to the user.

Because of the significant problems that loose conveyor pins have caused, numerous methods have been used to capture the pivot rods connecting the links in plastic conveyor belts. Such methods include forming heads on the ends of the rods, but these heads can be knocked off and they must be removed for replacement of the rods. The heads have been provided by melting the ends of the rod to provide enlarged ends or heads which are larger in diameter than the rod hole and thereby prevent the rod from moving inwardly through the belt, i.e., the enlarged heads provides means to capture the rods. However, there are numerous problems with this solution to the problem of capturing the rods. First, special equipment is normally required to thermally form the heads. Secondly, the heads are exposed on the edges of the belt in a vulnerable location since any protuberance on a conveyor can either wear or knock the heads of the rods thus allowing the rods to fall out of the belt. Thirdly, there is the problem of the Poisson effect, i.e., when a material undergoes a change in dimension due to an elastic deformation along one axis an opposite change in dimension or deformation occurs along a perpendicular axis. The amount of this opposite deformation is determined by Poisson's ratio. When the conveyor belt is in operation the rods are subjected to compressive forces perpendicular to the axis of the rod. These compressive forces can deform the rod making the diameter of the rod smaller in accordance with the theory of elasticity. In accordance with the Poisson effect the rod then elongates along its axis; in effect, the rod becomes longer than its original length. This in turn causes the rod to protrude further beyond the edge of the belt causing further problems of interference with conveyor structure which can result in significant belt damage and possible down time.

Another way of capturing the rod within the belt is to form a circumferential bead the internal diameter of which is less than the diameter of the rod, the beads being formed at the ends of the rod holes. Such is shown in U.S. Pat. No. 2,911,091 granted Nov. 3, 1959. However, such capturing of the rod is more or less permanent which doesn't take into conditions the need for disassembly and repair of the belt from time to time. Another solution to the problem of capturing a rod end is disclosed in U.S. Pat. No. 3,726,569 granted Apr. 10, 1973, in which the end of the rod hole and the outermost link end are plugged to prevent the rod from escaping from the belt. See also, U.S. Pat. No. 4,709,807 granted Dec. 1, 1987. However, such plugs can be inadequate due to the rod elongation force caused by Poisson's effect mentioned above and threaded plugs can cause stress risers and possible failure, in addition to extra manufacturing time and the cost of threading both the plug and the hole.

Another known method of capturing the rod is a snap-fitting end cap installed axially into the module rod hole or transversely into the module blocking off the rod hole. However, the general design requirement for snap-fit assembly as currently known requires that the plug or end cap be flexible so that its snap projection can deform during installation. This flexibility, which is normally accomplished by placing the snap fit projection at the ends of two flexible arms, also weakens the plug or cap and reduces its ability to resist rod elongation forces. Further, end caps which are installed axially into the rod hole place the entire rod elongation force caused by the Poisson effect on relatively small snap-fit projections. This results in the rods "popping" the end caps off of the end modules.

There is a need in the art for an improved arrangement for capturing the rods inter-linking modules of modular plastic conveyors.

Furthermore, one common design of plastic conveyors includes modules having a plurality of spaced inter-fitting link ends with intermediate members connecting opposed link ends, and one or more transverse members between the link ends connecting the intermediate members. See, for example U.S. Pat. Nos. 4,557,374 granted Dec. 10, 1985; 4,556,142 granted Dec. 3, 1985; 4,438,838 granted Mar. 27, 1984; 4,159,763 granted July 3, 1979; 4,080,842 granted Mar. 28, 1978; 3,870,141 granted Mar. 11, 1975; and German Pat. No. 113,669 granted Nov. 19, 1899. In one common design the link ends are all of substantially the same width, the modules are reversible and they are assembled in a "brick-lay" pattern so that the ends of one row of modules don't align with the ends of the adjacent row of modules. It is well known that this contributes further strength. In the known design, the sprocket teeth which drive the belt are either necessarily small, or enlarged sprocket tooth cavities (for permitting larger sprocket teeth) are formed between two transverse members and two intermediate members. It is desirable to have a modular design which permits large sprocket teeth, both in length and depth since sprocket tooth size is a key factor in determining both the wear resistance and strength of the sprocket. However, a large sprocket tooth cavity results in the placement of a link end between two intermediate members. In such a construction, when the belt made up of such modules is placed under a load as is the normal case in operation, the stress flow of the link ends located in the sprocket tooth cavity area must flow down the link end around the cross member and then to intermediate members connecting to link ends on the opposite side of the modules. With this construction the link end which is located between the two intermediate members cannot carry the same load as link ends on opposite sides of the module that are directly connected by an intermediate member.

In order to reduce manufacturing cost which is related to the costs of materials used in the belt, which in turn is related to the thickness of the link ends and to the molding cycle, it is desirable to maximize the strength of the belt and module versus the weight and to maximize the strength versus maximum thickness ratios since these two values are critical in determining the manufacturing cost.

For assembly of a belt in a brick-lay pattern there is need to control the centers where the modules occur to assure that all sprocket tooth cavities line up. If bricklaying is started improperly, the belt must be pulled apart and reassembled. There is a need in the art for a modular belt which accomplishes the foregoing desirable results.

SUMMARY OF THE INVENTION

This invention is in the setting of a plastic conveyor belt composed of a plurality of modules with inter-fitting link ends which modules are held together by elongated rods extending through holes in the link ends. The rods are captured by specially constructed outer link ends of uniquely shaped end modules. For capturing the rods the outermost module is relatively wide and has a slot therethrough perpendicular to the axis of the rod hole. A blocking member is insertable into the hole perpendicular to the rod to block the movement of the rod. The blocking member has a flat surface facing the rod end and a projection for fitting into the rod hole on an opposite surface. The shape of the blocking member is configured so as to be assembled in only one position and to be flush with the surface of the link end. The projection has ramps for insertion and removal and the assembly is configured so that the blocking member can be snapped in and out of the outermost link end in case the belt needs to be disassembled or repaired.

The belt is composed of internal modules and four different end modules (there are two different size end modules for each side of the belt). The end modules on each end, of course, are reversed. The end modules have the widest link end on the outside and the next widest link end adjacent the outside. One of the end modules has only one link on one side and two link ends on the other side. The widest end module and the internal module are configured such that the narrowest link ends are offset in a direction toward an adjacent intermediate member in order to balance the module from the standpoint of location of maximum and minimum width link ends versus maximum and minimum module section rigidities in order to achieve the goal of providing a module and belt of minimum weight and minimum average section thickness for a given design strength and requirement.

BRIEF DESCRIPTION OF THE DRAWINGS

FIG. 2 is an exploded end view of the end module of FIG. 1 and the blocking means;

FIG. 3 is a perspective view of a portion of an end module showing the means in the outermost link end for capturing the rod.

DETAILED DESCRIPTION OF THE PREFERRED EMBODIMENT

Figure 1:
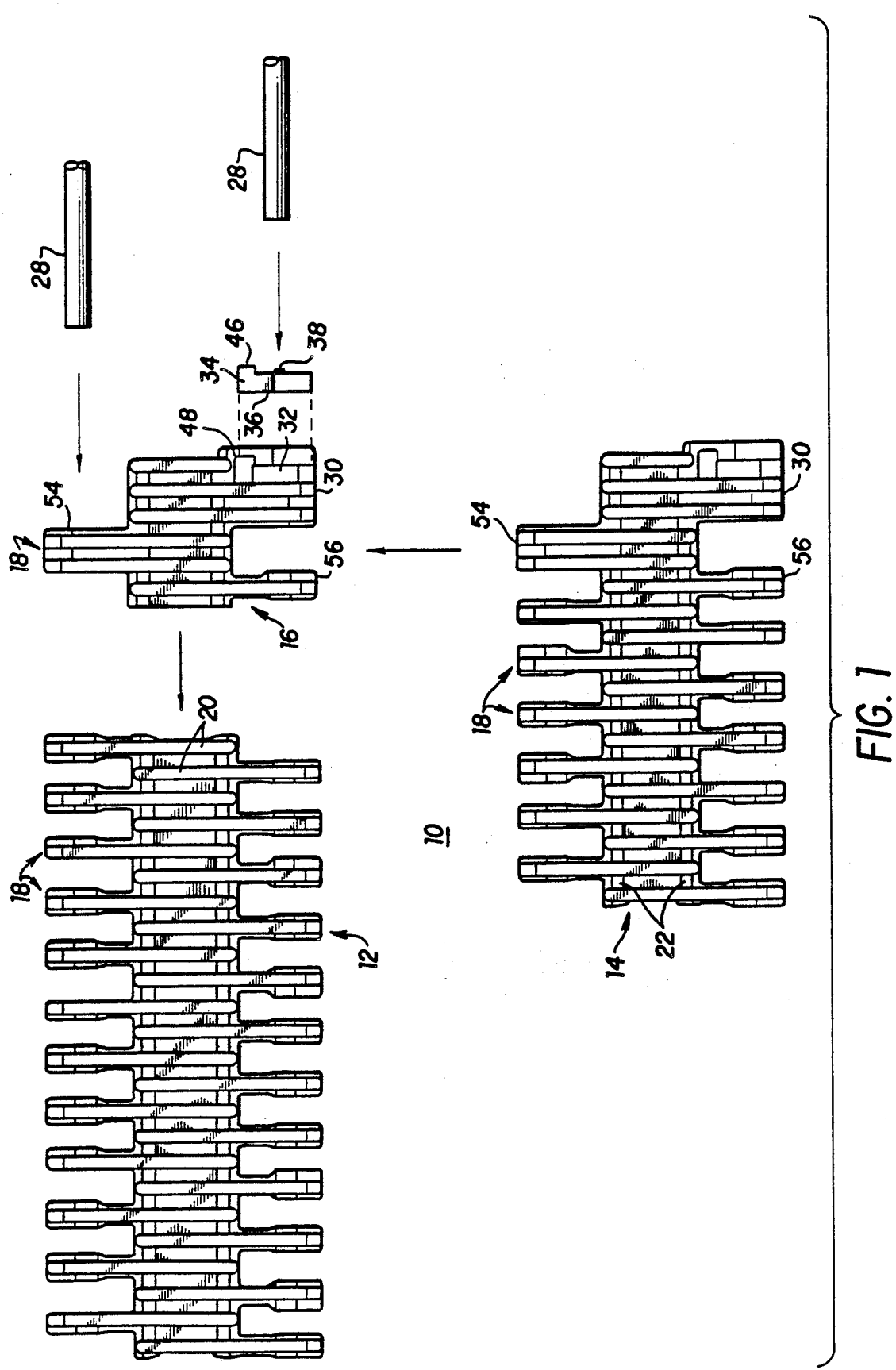
FIG. 1 is an exploded view showing the assembly of three different modules of this invention together with connecting rods and the connecting rod capturing means.

A plastic conveyor belt 10 is of the type formed by a plurality of plastic modules linked together with connecting rods and having spaced inter-fitting link ends. The belt of this invention is constructed of an internal module or modules 12 and end modules such as wide-end module 14 and narrow-end module 16. Other width internal modules could also be used.

Each of the modules have inter-fitting spaced link ends 18 which are varying in number and width as illustrated in the drawings and as will be explained. On each of the modules the link ends are connected by intermediate members 20 and transverse members 22. On the underside of the module the transverse members and selected ones of the intermediate members form sprocket pockets 24 for teeth of driving sprockets.

Each of the link ends 18 of each of the modules has a rod hole 26 extending transversely therethrough of a suitable diameter to accommodate the connecting or pivot rods 28 as is known in the art. The modules are assembled as illustrated in FIG. 1 to create an assembly (not shown) with end modules at each end and with the rods 28 inserted through the rod holes 26.

In order to capture the rods in the rod holes and prevent them from moving outwardly a rod capturing means is provided which includes a wide link end 30 on the outermost edge of end modules 14 and 16. A slot 32 extends through the link end 30 from the top to the bottom thereof intersecting the rod hole 26. The slot is configured to accommodate a blocking member 34 as shown in FIGS. 1, 2, and 3. Blocking member 34 has a flat side 36 against which the rod end abuts and a projection 38 on the outer side. Projection 38 has an insert ramp portion 40, a dwell or hold portion 42 which is less than the width of the hole, and an exit ramp portion 44. These portions allow for pop-in insertion and removal of the blocking member.

The blocking member has a head extension 46 which fits within a recess 48 in link end 30 in order that the blocking member must always be assembled in the correct position. The top surface 50 of the blocking member is configured with the surface 52 of the link end so that the top of the blocking member is flush therewith.

The flat side 36 of the blocking member 34 provides a solid high contact area for absorbing rod elongation pressure from the end of rod 28. The projection 38 is configured such that it can be easily inserted into the link end 30 during assembly or installation while solidly retaining the member in place during operation. Once installed the projection 38 rests in the rod hole 26 of link end 30. The upper section of link end 30 which forms the perimeter of the rod hole is dimensioned such that it will deform to allow entry of the blocking member yet recover to its original form after insertion of the blocking member. With this invention any connecting rod elongation and the forces therefrom push against a solid blocking member which distributes the forces to rigid sections of the wide link end 30 of the end modules 14 and 16. Additionally, the projection 38 is oriented such that rod elongation forces more securely lock the blocking member 34 in place. Therefore the rod elongation forces make the blocking member more secure and prevent the rod from leaving the belt. The solid blocking member is essentially non-deformable while the outer portion of the link end is deformable to permit insertion and extraction of the blocking member.

Each of the end modules 14 and 16 are configured with a series of three graduated width link ends to properly absorb the rod elongation forces and transmit them to the internal structure of the belt. The outermost link end 30 is the widest since it must accommodate the blocking member and transmit the entire belt rod elongation forces to the belt. The next adjacent link end 54 is dimensioned somewhat smaller but still sufficient to absorb the high shear forces in the belt created by the outside link end. The next link end 56 is somewhat narrower than link end 54, but larger than any of the link ends 18 of the internal module 12.

A significant advantage of this invention is that the end modules 14 and 16, and the blocking member 34 contain the rods 28 on both edges of the belt 10. This permits free access to the belt rod from either side of the belt and such is of critical importance in installation and maintenance. For example, often due to conveyor structure only one side of the belt is accessible. With conventionally designed belts having one side accessible and the other side closed (or with a small hole for a drift pin), installation and maintenance can be extremely difficult. Additionally, a common practice when replacing damaged belt modules is to progressively remove the two existing connecting rods by pushing in new rods. When the damaged module is approached, the two existing connecting rods are pulled back just far enough to insert a new module. Once inserted the replacement rods are used to push the old rods out. In this manner damaged sections can be replaced without completely disassembling the belt. Such a method is impossible to utilize with a construction that does not permit free access to the connecting rods 28 from both edges of the conveyor belt 10.

Figure 4:
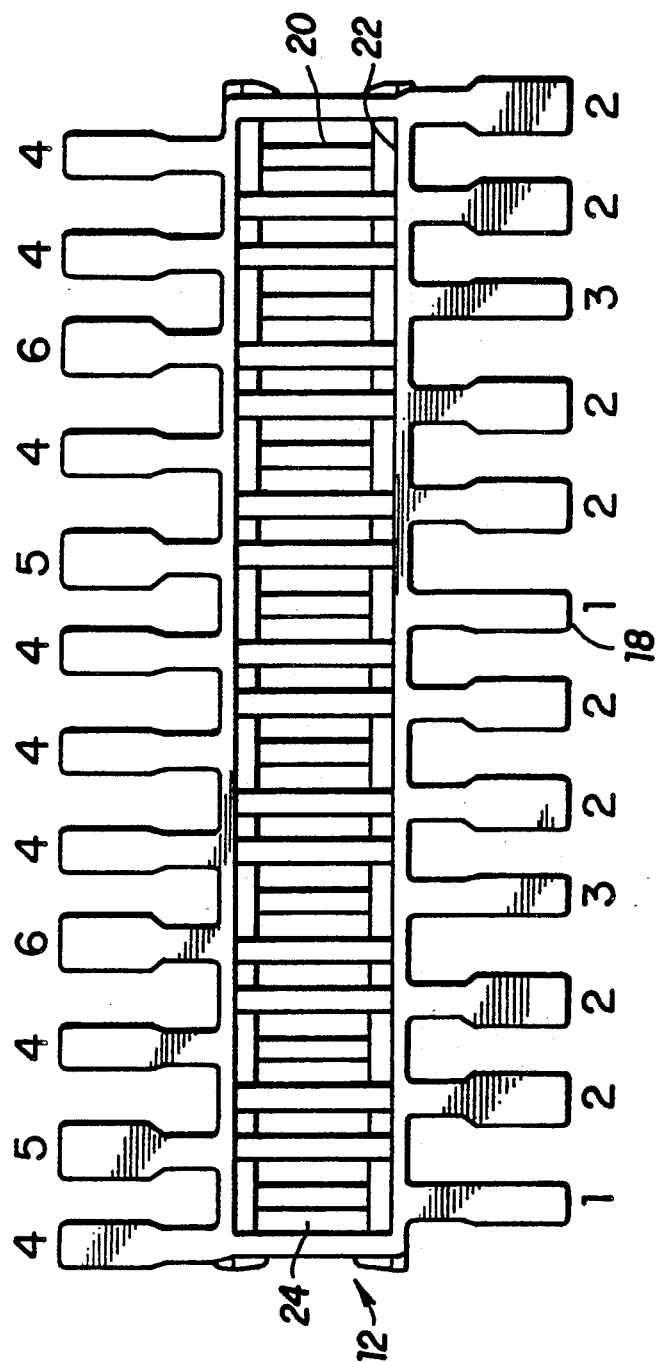
FIG. 4 is a bottom plan view of an assembly of modules showing the position of the sprocket holes vis-a-vis the thicker and thinner link ends.

As shown in FIG. 4 the sprocket pockets 24 cause some of the intermediate members 20 to be less than full thickness. In some of the places this occurs the link ends are narrower so that they don't put as much strain on the module. For example, the link ends numbered 1 in FIG. 4 do not connect with an intermediate member 20 and the same applies to some of the link ends numbered 3 and 4. The other link ends being wider are connected through a full size intermediate member. Additionally, the narrower link ends are offset and the direction of offset is toward the closest intermediate member as shown in the drawing in FIG. 4.

Although a preferred embodiment of the invention has been described, it would be apparent to those skilled in the art that variations can be accomplished and the description of the preferred embodiment is for enablement purposes and does not constitute a limitation of the invention.

What is claimed is:

1. A conveyor belt module for the interior of a conveyor belt constructed of a plurality of modules having interfitting link ends connected by pivot rods, the module having a plurality of spaced link ends on both sides thereof; intermediate members connecting the link ends, transverse members connecting the intermediate members, wherein the transverse members and some of the intermediate members form sprocket holes to allow the belt to be driven by a sprocket wheel, wherein some of the link ends are of unequal width so as to provide at least a plurality of narrow link ends and at least a plurality of wide link ends on each side thereof, arranged to allow said conveyor belt module to be assembled with other modules of the belt in a brick-laying pattern while preventing assemblage of the conveyor belt with an interior module of the belt in an orientation reversed from that of other interior modules in the belt, each link end being connected to an intermediate member by a shank portion that is narrower than its corresponding link end and a plurality of the narrow link ends being offset of their respective shank portions in a direction toward intermediate members adjacent the offset link ends.

* * * * *